United States Patent Office 3,083,892
Patented Apr. 2, 1963

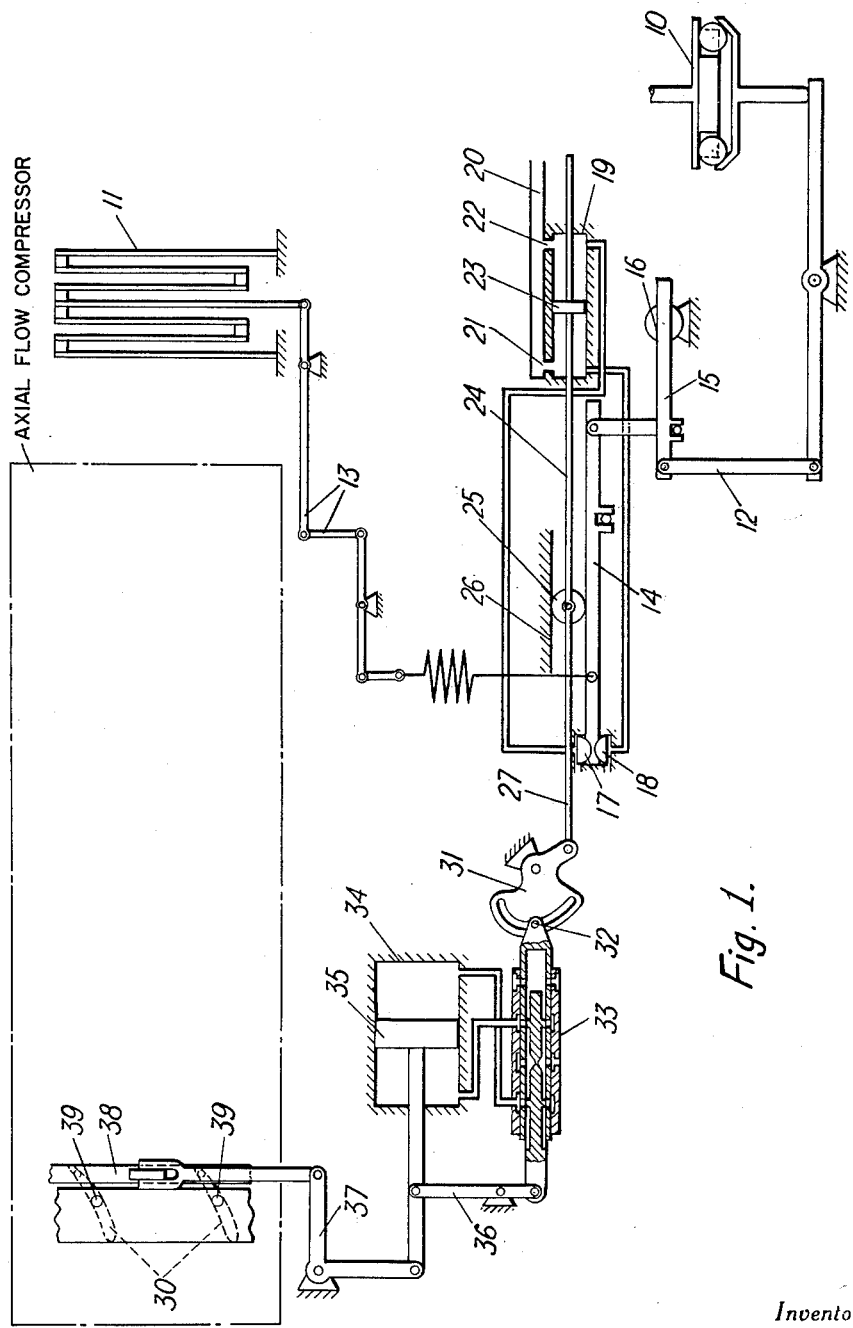

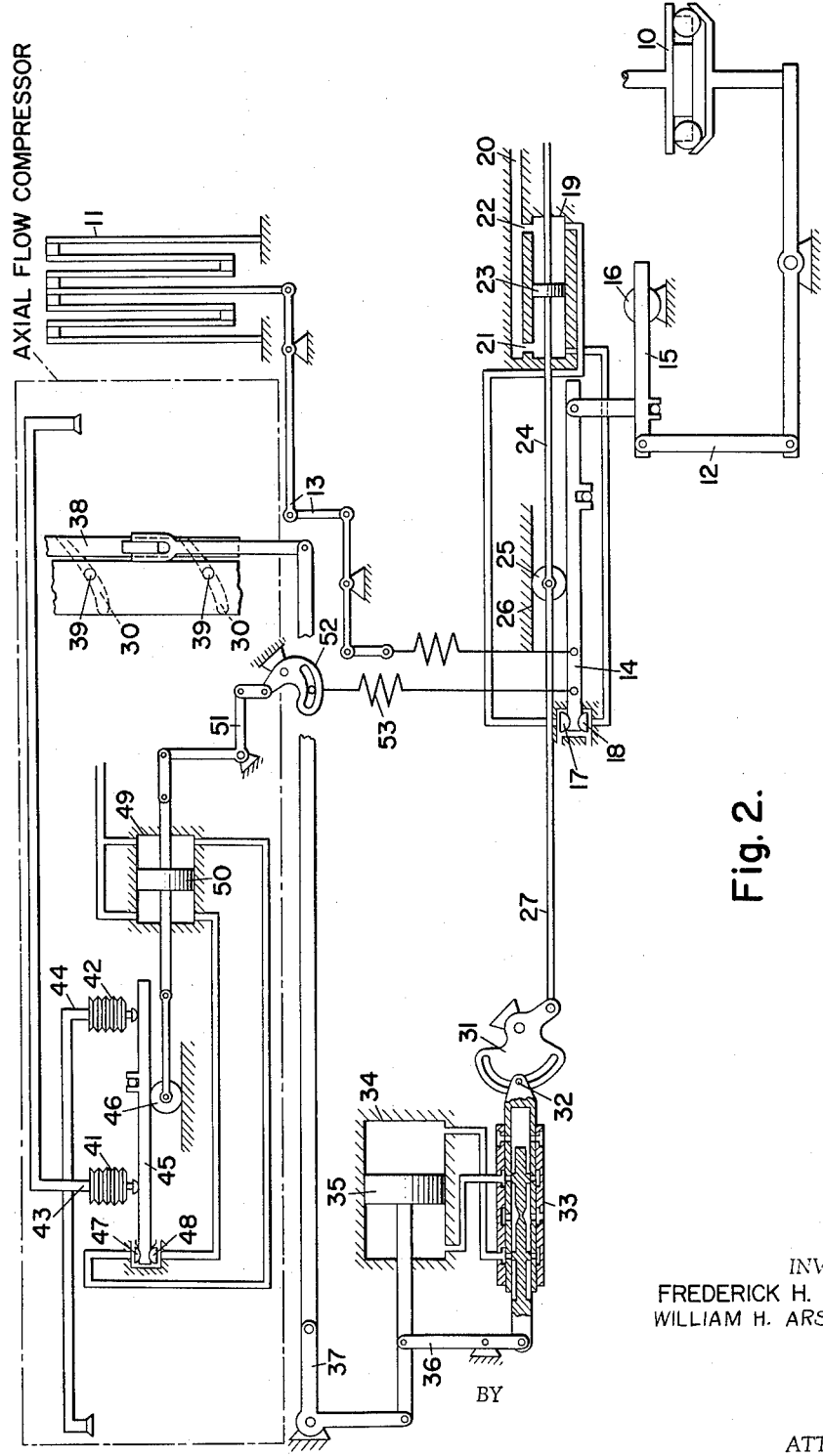

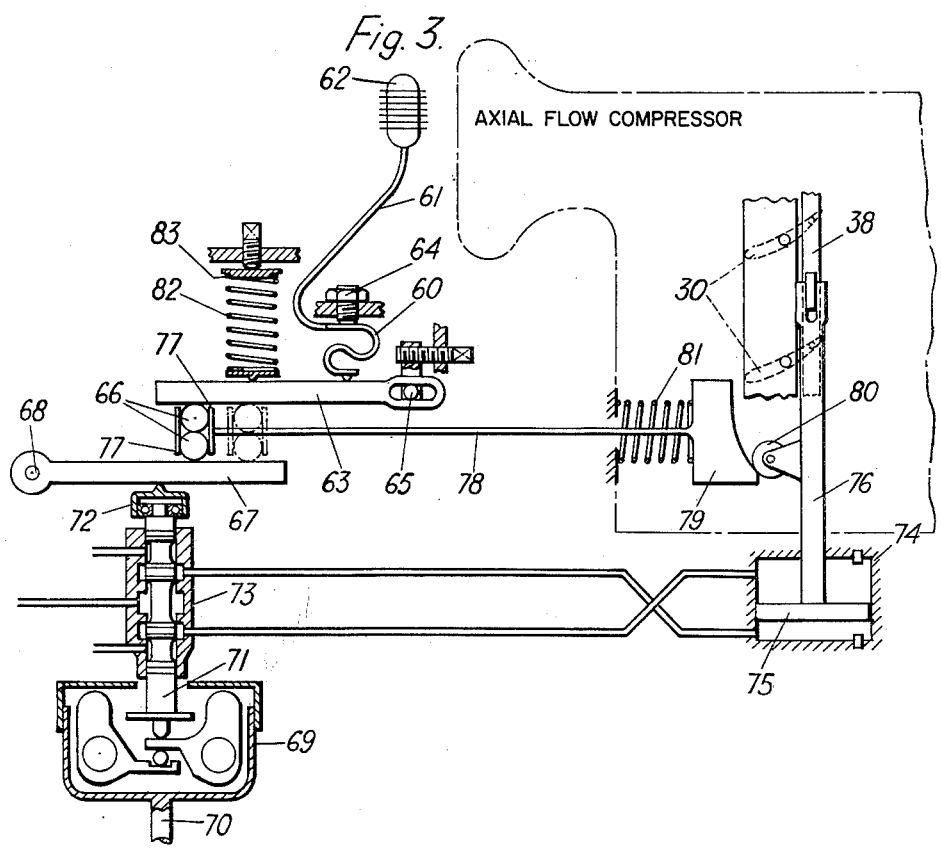

3,083,892
CONTROL OF VARIABLE PITCH STATOR BLADES OR VANES IN AXIAL FLOW MACHINES
Frederick H. Carey, Cheltenham, and William H. Arscott, Woldingham, England, assignors to The De Havilland Engine Company Limited, Leavesden, Hertfordshire, England, and Dowty Fuel Systems Limited, Cheltenham, Gloucestershire, England, both companies of Great Britain
Filed Oct. 28, 1957, Ser. No. 692,737
Claims priority, application Great Britain Nov. 1, 1956
11 Claims. (Cl. 230—114)

This invention relates to mechanism for adjusting the controls of axial flow machines, such as gas turbine engines, as used for example for aircraft propulsion purposes. The invention may be applied to main fuel controls, reheat fuel controls, or exhaust nozzle controls, for example, but it is particularly applicable to controls for adjusting the angle of incidence of inlet guide vanes or stator blades in axial flow compressors forming part of such gas turbine engines.

From the theory of compressors it is known that a given compressor is capable of maintaining a designed pressure at exit under design conditions but this pressure will only be attained if the turbine and final propelling nozzle are also operating at the corresponding design conditions. Hence if in a gas turbine engine these components do not match one another then the flow through the engine will change until the compressor is delivering such a flow at such a pressure as will be acceptable to both the turbine and propelling nozzle. Again, a power-output or speed control is generally required and is often secured by adjustment of the gas temperature, which in turn changes the mass flow for a given pressure ratio resulting in the need for a new matching point for compressor, turbine and propelling nozzle.

Further, it is possible when operating at constant speed for conditions to vary in such a way that the flow through the compressor is reduced to a value below the design value. In this case the pressure produced may tend to rise slightly reaching a maximum at some reduced value of the flow. At, or soon after, such a maximum pressure has been reached a surge begins and can reach such a magnitude as to cause mechanical damage to the compressor.

An example of this is the effect of increasing the fuel flow to an engine in order to accelerate. A margin, that is to say, a gap between the operating line and the surge line is necessary in the intermediate speed range to permit acceleration and achieve stable operation.

Several methods for changing, or modifying, the engine component characteristics in order to enable satisfactory matching of the compressor, turbine and propelling nozzle design points and so avoid surge or stall have already been proposed. These proposals include the use of "blow-off" valves, variable area propelling nozzles or variable incidence blades. These blades may be turbine nozzle blades, compressor inlet guide vanes or compressor stator blades. It is usually desirable, however, to vary the incidence of compressor rather than turbine blades, since the former are cooler and more suitable.

The present invention employs variable incidence inlet guide vanes for preference, but may also be applied to stator blades, or both, and reference to inlet guide vanes hereinafter should be understood to include also an application of the invention to stator blades.

If the above-mentioned characteristics matched then an engine could be run with fixed inlet guide vanes or even without inlet guide vanes according to the design. Otherwise, partial, or sufficient, matching may be obtained to avoid surge by the use of inlet guide vanes which would always be in one of two positions, one position at low rotational speeds and the other position at high rotational speeds, change over taking place rapidly at some intermediate position. Such an arrangement would not necessarily, however, give optimum handling characteristics or stability of operation.

It has been found that during engine running improved engine characteristics and stability of operation may be obtained by continuously varying the incidence angle of the inlet guide vanes.

According to the invention apparatus for adjusting a control member in an axial flow machine comprises a movable element subject to opposing forces which vary respectively in accordance with variations in at least two independent variable operating conditions of the machine, means operated by movement of said movable element to adjust the effective value of at least one of said forces relative to the other, in a sense such as to obtain a balance between said forces, and means for adjusting the control member in response to movement of said movable element.

In the particular application of the invention where the apparatus is used to prevent stalling or surge of the compressor of a combustion gas turbine, the control of the angle of incidence preferably follows a law which is a function of $N^2/T$ where N is the rotational speed of the compressor and T is the absolute temperature of the air at the inlet to the compressor which automatically includes variations caused by the aircraft's forward speed and altitude. The invention thus provides for forces proportional to these two parameters $N^2$ and T to be opposed to one another, and then balanced, and the balancing movement is then used to operate the mechanism for adjusting the attitude of the guide vanes.

Thus in a preferred form of the invention the apparatus includes differential mechanism to different points in which the forces are applied so as to oppose one another through the agency of a reaction member, means for varying the relative ratio of the differential mechanism between the reaction member and the applied forces respectively, in response to movement of the mechanism, so as automatically to provide a balance between the opposing forces, and means sensitive to the relative ratio of the differential mechanism arranged to operate the mechanism controlling the angle of incidence of the guide vanes. Where more than two forces are involved at least two forces will oppose one another, the additional forces supplementing or detracting from one or other of these two forces.

According to a preferred feature of the invention the apparatus comprises a floating differential lever system (which may comprise one or more levers), temperature sensitive apparatus and speed sensitive apparatus acting on spaced points on the lever system, and a movable fulcrum at a third point on the lever system, and means for moving the fulcrum longitudinally so as to counterbalance the opposing temperature and speed-variable forces automatically in response to pivotal movements of the lever system due to variations in either of these forces.

The means adopted for moving the fulcrum preferably comprises a servo mechanism actuated by a control associated with the lever system itself, so as to act as a follow-up servo mechanism, and in some cases the servo mechanism may include a cam or the equivalent arranged to provide any required relationship between the movement of the fulcrum and the movement of the guide vanes.

The invention may be performed in various ways and three specific embodiments will now be described by way of example with reference to the accompanying drawings, in which FIGURE 1 is a diagrammatic illustration partly in section of one form of the invention comprising two condition sensitive devices;

FIGURE 2 is a similar diagrammatic illustration of another form of the invention, comprising three condition sensitive devices; and FIGURE 3 is a diagrammatic illustration of a third form of the invention comprising two overlapping differential levers.

In the first example the apparatus comprises a device 10 providing a response proportional to the square of the engine speed, for example a centrifugal governor, and a temperature sensitive device 11 for example a differential expansion thermometer exposed to air at or received from the air intake of the engine compressor. The governor 10 and the thermometric device 11 are arranged to act through linkages 12, 13 on spaced points of a floating differential lever 14. One link 15 of the linkage 12 is adjustable longitudinally in an end pivot 16 so as to provide for adjusting the effective thrust exerted by the centrifugal governor 10 on the floating lever 14 so that if the characteristics of the temperature responsive element 11 differ from the designed temperature/force rate, then a corresponding adjustment can be made to effect a proportional change to the applied centrifugal loading.

One end of the floating lever 14 is connected to a pair of half-ball hydraulic relief valves controlling the escape of pressure fluid from one side or the other of a main servo ram cylinder 19 to which pressure fluid is supplied via a pressure line 20, and restricted apertures 21, 22. A ram piston 23 is connected by a link 24 to a roller 25 which bears on the upper face of the floating lever 14 and acts as a moving fulcrum between the points of application of the forces applied by the thermometric device 11 and the centrifugal governor 10. The reaction force on the roller is absorbed by a stationary plane surface 26 on the under side of which the roller runs.

Thus any movement of the floating lever 14 due to an out of balance force between the thermometric device 11 and the centrifugal governor 10 will cause the valves 17, 18, to allow fluid to escape from one side or the other of the main servo ram 23, which will cause the moving fulcrum 25 to take up a position in which the forces are again balanced.

The main servo ram 23 is also connected to mechanism for altering the angle of incidence of variable inlet guide vanes 30. In this particular example the ram is connected through the link 24 and a pivoted link 27 to a slotted cam 31, the slot of the cam being engaged by a pin 32 connected to the pilot valve 33, of a hydraulic follow-up servo system. The valve 33 controls the supply and escape of fluid to and from the opposite ends of a follow-up servo ram cylinder 34, containing a ram piston 35 which is connected through a linkage 36 to the pilot valve 33 in well known manner. The ram 35 is also connected through a linkage 37 to a ring 38 extending around the air intake of the compressor adjacent the guide vanes 30, and pivotally attached to each vane. The vanes themselves are mounted so as to be capable of pivotal movements about their longitudinal axes on fixed pivots 39, and thus pivot simultaneously through equal angles in response to movements of the ring 38.

In operation the main servo ram 23 adopts a linear position which corresponds to the linear position of the moving fulcrum roller 25 on the floating lever 14, and therefore to the instantaneous value of $N^2/T$. The required adjustment of the angle of incidence of the inlet guide vanes 30 of an axial flow compressor is however not necessarily a linear function of the value $N^2/T$, and may be of sinusoidal or some other arbitrary form. In the particular arrangement described the function is approximately sinusoidal. During a normal acceleration of the engine the guide vanes are required to progressively coarsen in pitch until a change-over point is reached after which the pitch becomes finer. The translation from linear to sinusoidal movement in the present example is provided by the slotted cam 31 connecting the main servo ram 23 to the pilot follow-up valve servo valve 23, and thence to the vanes 30.

For certain operating conditions, particularly at high forward flight speeds, the ram effect of the air entering the machine may react through the temperature sensitive devices to impose undesirable movements on the inlet guide vanes, and it may be necessary to apply a correction factor, which varies with a third operating condition of the machine, such as the ratio between the ram air pressure and static pressure. In the particular example illustrated in FIGURE 2 means are provided for applying a third force to the differential lever 14 which varies with variations in the ratio between the inlet and delivery pressures of the compressor.

Thus the apparatus also includes a pair of bellows-type capsules 41, 42, connected via conduits 43, 44 to the inlet and delivery ducts of the compressor, and acting on a floating differential link 45 which bears on a movable fulcrum roller 46, and at one end is connected to a pair of half-ball valves 47, 48, controlling the escape of fluid from opposite ends of a ram cylinder 49. A ram piston 50 within this cylinder is connected to the fulcrum roller 46 and also through a bell-crank lever 51 to a cam plate 52 having a cam slot in which slides a follower connected through a spring 53 to the lever 14 at a point adjacent to the point of application of the force provided by the thermal expansion device 11. In all other respects the apparatus is identical with the example previously described. Thus it will be seen that depending upon the form of the slotted cam plate 52 a third force will be applied to the lever 14 which varies in some predetermined relationship with the ratio between the inlet and delivery pressures of the compressor.

In the example illustrated in FIGURE 3 the main elements of the apparatus are basically similar to those described above, but the constructional details differ somewhat. The thermal differential expansion device in the first example is replaced by a Bourdon tube 60 connected through a pressure conduit 61 to a bulb 62 arranged in the air intake. The Bourdon tube bears on a lever 63 and therefore exerts a force on the lever proportional to the absolute air intake temperature. The zero setting of the Bourdon tube can be adjusted by a screw-threaded support bolt 64. One end of the lever 63 is pivotally connected to a stationary pivot 65, whose position can be adjusted in a horizontal direction, and the other end of the lever bears on a twin-roller assembly 66, which bears in turn on a second lever 67 which is pivotally mounted on a fixed pivot 68 at its end remote from the Bourdon tube 60. The two levers 63, 67 together with the roller assembly 66, constitute a differential floating lever system.

A centrifugal governor 69, driven by a shaft 70 which is geared to the main turbine shaft of the engine (not shown) acts through a push rod 71 and a bearing cap 72 on the under side of the second link 67 at a point spaced appreciably from the fixed pivot 68. The force exerted is thus proportional to engine speed.

The push rod 71 itself constitutes the spindle of a hydraulic servo valve 73 controlling the admission and escape of fluid to and from opposite ends of a hydraulic servo ram cylinder 74. A servo ram 75 in this cylinder is connected through piston rod 76 to a vane operating ring 38 which controls the angular positions of inlet guide vanes 30 in the same manner as in the previous example.

The roller assembly 66, which constitutes a movable fulcrum for the differential lever system, is constrained to move horizontally between two guide plates 77 connected to a link 78 which is attached to a cam member 79 urged into engagement with a roller 80 on the rod 76 by means of a spring 81. Thus the horizontal position of the rollers 66 is determined by the position of the rod 76, and corresponds to the instantaneous angular position of the guide vanes 30, but due to the intervention of the cam 79, the relationship between the position of the rollers and guide vanes is variable proportional, for the reasons pointed out in connection with the embodiment illustrated in FIG. 1.

The upper surface of the lever 63 is loaded by a spring 82 having an adjustable abutment 83, one purpose of this pre-loading of the system being to ensure that the roller assembly 66 is always in contact with both levers 63 and 67.

In operation the force of the governor 69 is opposed to that of the Bourdon tube 60, and any consequent vertical movements of the differential system result in corresponding movements of the valve spindle 71. The ram 75 thus moves to alter the setting of the guide vanes 30, and at the same time the cam 79 acts to adjust the position of the fulcrum rollers 66 to restore the differential system to equilibrium, and return the valve spindle 71 to its closed position.

What we claim as our invention and desire to secure by Letters Patent is:

1. In combination, a control member and apparatus for automatically adjusting said control member, said apparatus comprising two condition sensitive devices adapted to respond respectively to the values of two independently variable operating conditions, each device including an output member which exerts a thrust which varies in accordance with variations in the respective condition, a floating differential lever normally occupying a neutral position, and a movable fulcrum bearing on the lever and acting as a reaction member, the output members of the condition sensitive devices being operatively connected to the differential lever at spaced points in its length so as to oppose one another through the movable fulcrum so that an increase in one variable tends to move said lever from said neutral position in a direction opposite to that in which it is moved by an increase in the other variable, servo means connected to the fulcrum to control its longitudinal position so as to vary the differential ratio of the lever between the points of application of the output members of the condition sensitive devices, means sensitive to movements of the lever and connected to and actuating said servo means in response to movement of said differential lever in either direction from said neutral position to automatically move the fulcrum to provide a balance between the two opposing forces and cause said lever to return to its neutral position, and connection means between the control member and said movable fulcrum for adjusting said control member in response to movements of said movable fulcrum, said connection means including cam means to provide the required non-linear relationship between the movement of the fulcrum and the movement of the control member.

2. In an axial flow compressor of the type comprising an adjustable control member, the combination with said compressor of apparatus for automatically adjusting the setting of said control member, said apparatus comprising two condition sensitive devices adapted to respond respectively to the values of two independently variable operating conditions of the compressor, each device including an output member which exerts a thrust which varies in accordance with variations in the respective condition, a floating differential lever normally occupying a neutral position and a movable fulcrum bearing on the lever and acting as a reaction member, the output members of the condition sensitive devices being operatively connected to the differential lever at spaced points in its length so as to oppose one another through the fulcrum so that an increase in one variable tends to move said lever from said neutral position in a direction opposite to that in which it is moved by the increase in the other variable, servo means connected to the fulcrum to control its longitudinal position so as to vary the differential ratio of the lever between the points of application of the output members of the condition sensitive devices, means sensitive to movements of the lever and connected to and actuating said servo means in response to movement of said lever in either direction from said neutral position to automatically move the fulcrum to provide a balance between the two opposing forces and cause said lever to return to its neutral position, and means connected between the control member of the compressor and said movable fulcrum for adjusting said control member in response to movements of said movable fulcrum, said last mentioned means including cam means to provide the required non-linear relationship between the movement of the fulcrum and the movement of the control member.

3. In combination, a control member and apparatus for automatically adjusting said control member, said apparatus comprising two condition sensitive devices adapted to respond respectively to the values of two independently variable operating conditions, each device including an output member which exerts a thrust which varies in accordance with variations in the respective condition, two overlapping levers pivoted at their remote ends and an intermediate movable fulcrum on which the adjacent ends of the levers bear, the output members of the condition sensitive devices being operatively connected respectively to the two levers to oppose one another through the movable fulcrum, servo means responsive to the movements of said overlapping levers, said servo means being connected to actuate said control member, and cam means through which said servo means is connected to said fulcrum to adjust the longitudinal position of the fulcrum so as to vary the relative values of the thrusts from the two devices, said cam means serving to provide the required non-linear relationship between the movement of the fulcrum and the movement of the control member.

4. In an axial flow compressor of the type comprising an adjustable control member, the combination with said compressor of apparatus for automatically adjusting the setting of said control member, said apparatus comprising two condition sensitive devices adapted to respond respectively to the values of two independently variable operating conditions of the compressor, each device including an output member which exerts a thrust which varies in accordance with variations in the respective condition, two overlapping levers pivoted at their remote ends and an intermediate movable fulcrum on which the adjacent ends of the levers bear, the output members of the condition sensitive device being operatively connected respectively to the two levers to oppose one another through the movable fulcrum, servo means responsive to the movement of said overlapping levers, said servo means being connected to said control means, and cam means through which said servo means is connected to the fulcrum to adjust the longitudinal position of the fulcrum so as to vary the relative values of the thrusts from the two devices, said cam means serving to provide the required non-linear relationship between the movement of the fulcrum and the movement of the control member.

5. In an axial flow machine of the type comprising an adjustable control member, the combination with said machine of apparatus for automatically adjusting the setting of said control member, said apparatus comprising two devices sensitive respectively to the rotational speed of the machine and the temperature at a specific point within the machine, each device including an output member which exerts a thrust which varies in accordance with variations in the respective condition, differential lever means normally occupying a neutral position, and a movable fulcrum on which said differential lever means bear, the output members of the condtion sensitive devices being operatively connected to said differential lever means to oppose one another through the movable fulcrum so that an increase in speed tends to move said lever means from said neutral position in a direction opposite to that in which it is moved by an increase in temperature, means operatively connecting said control member and movable fulcrum to form therewith a cooperatively acting unit and comprising cam means providing a variable proportional relationship between the movements of said fulcrum and control members, together with servo means responsive to the movement of said differential lever means and acting upon said cooperatively acting unit in response to movement of said differential lever means in either direction from said neutral position to adjust the position of said control member and adjust the longitudinal position of said fulcrum with respect to said diffential lever means so as to cause said lever means to return to its neutral position.

6. Apparatus as claimed in claim 2 in which the axial flow compressor includes a set of adjustable inlet guide vanes and in which the control member comprises a mechanism connected to adjust the attitude of the inlet guide vanes.

7. Apparatus as claimed in claim 2 in which two of the condition sensitive devices are sensitive respectively to the square of the rotational speed of the compressor and to the absolute temperature of the gas at a predetermined point in its passage through the compressor.

8. Apparatus as claimed in claim 2 in which one of the condition sensitive devices is sensitive to the square of the rotational speed of the compressor and comprises a centrifugal device with rotating weights.

9. Apparatus as claimed in claim 4 in which the axial flow machine includes a set of adjustable inlet guide vanes and in which the control member comprises a mechanism connected to adjust the attitude of the inlet guide vanes.

10. Apparatus as claimed in claim 4 in which the condition sensitive devices are sensitive respectively to the square of the rotational speed of the compressor and to the absolute temperature of the gas at a predetermined point in its passage through the compressor.

11. Apparatus as claimed in claim 4 in which one of the condition sensitive devices is sensitive to the square of the rotational speed of the compressor and comprises a centrifugal device with rotating weights.

References Cited in the file of this patent

UNITED STATES PATENTS

| | | |
|---|---|---|
| 2,217,364 | Halford et al. | Oct. 8, 1940 |
| 2,371,983 | Foryth et al. | Mar. 20, 1945 |
| 2,374,708 | Shoults | May 1, 1945 |
| 2,376,199 | Shoults | May 15, 1945 |
| 2,409,836 | Coe | Oct. 22, 1946 |
| 2,409,837 | Alford | Oct. 22, 1946 |
| 2,454,038 | Crever | Nov. 16, 1948 |
| 2,542,839 | Reggio | Feb. 20, 1951 |
| 2,560,914 | Almeras | July 17, 1951 |
| 2,613,500 | Lysholm | Oct. 14, 1952 |
| 2,643,055 | Sorteberg | June 23, 1953 |
| 2,705,590 | Lovesey et al. | Apr. 5, 1955 |
| 2,715,311 | Coar | Aug. 16, 1955 |
| 2,738,644 | Alford | Mar. 20, 1956 |
| 2,741,423 | Lombard | Apr. 10, 1956 |
| 2,785,848 | Lombard et al. | Mar. 19, 1957 |
| 2,824,548 | Roche et al. | Feb. 25, 1958 |
| 2,950,857 | Williams et al. | Aug. 30, 1960 |
| 2,974,640 | Lindbom et al. | Mar. 14, 1961 |
| 2,980,065 | Werts | Apr. 18, 1961 |

FOREIGN PATENTS

| | | |
|---|---|---|
| 458,350 | Great Britain | Dec. 17, 1936 |
| 562,592 | Great Britain | July 7, 1944 |
| 691,449 | Germany | May 27, 1940 |
| 735,159 | Great Britain | Aug. 17, 1955 |
| 745,905 | Great Britain | Mar. 7, 1956 |
| 806,465 | Germany | June 14, 1951 |